Patented Jan. 12, 1943

2,307,968

UNITED STATES PATENT OFFICE 2,307,968

ELECTRIC WELDING APPARATUS

Arthur B. Sonneborn, Detroit, Mich., assignor to The Clark Controller Company, Cleveland, Ohio, a corporation of Ohio Application December 29, 1937, Serial No. 182,227

12 Claims. (Cl. 219—4)

This invention relates to electric welding apparatus, and particularly to electric resistance welding apparatus of the type comprising a welding gun or welding machine operated by fluid pressure such as compressed air, to engage work to be welded between electrodes thereof, and an electric contactor which energizes an electric circuit to the electrodes for a timed interval to cause a measured welding current impulse to flow through the work.

Among the objects of this invention are:

To provide an improved electric contactor and an improved control therefor;

To provide an improved electric contactor of the pneumatically operated type;

To provide a control for a welding current contactor which will co-ordinate the functions thereof with those of a welding gun or machine in an improved manner;

To provide an improved means of causing the electrodes of a welding gun or machine to remain engaged for a predetermined time interval after a welding current impulse has passed therethrough;

To provide improved means for timing the frequency at which successive operations of a welding current control contactor occur.

To provide an improved control for a welding current contactor in co-ordination with a welding gun or machine by which the contactor, only after the electrodes of the machine have engaged the work, will operate to close the welding current circuit to the electrodes for a timed interval, and then interrupt it, and the electrodes will remain engaged for a time interval thereafter, and the contactor will then be conditioned for another operation.

Other objects will be apparent to those skilled in the art to which my invention appertains. My invention is fully disclosed in the following description taken in connection with the accompanying drawing, in which Fig. 1 is a view partly diagrammatic illustrating an embodiment of my invention and showing, in co-ordinated relation, a welding machine, a control gun therefor, and a welding current control contactor.

Figure 1:
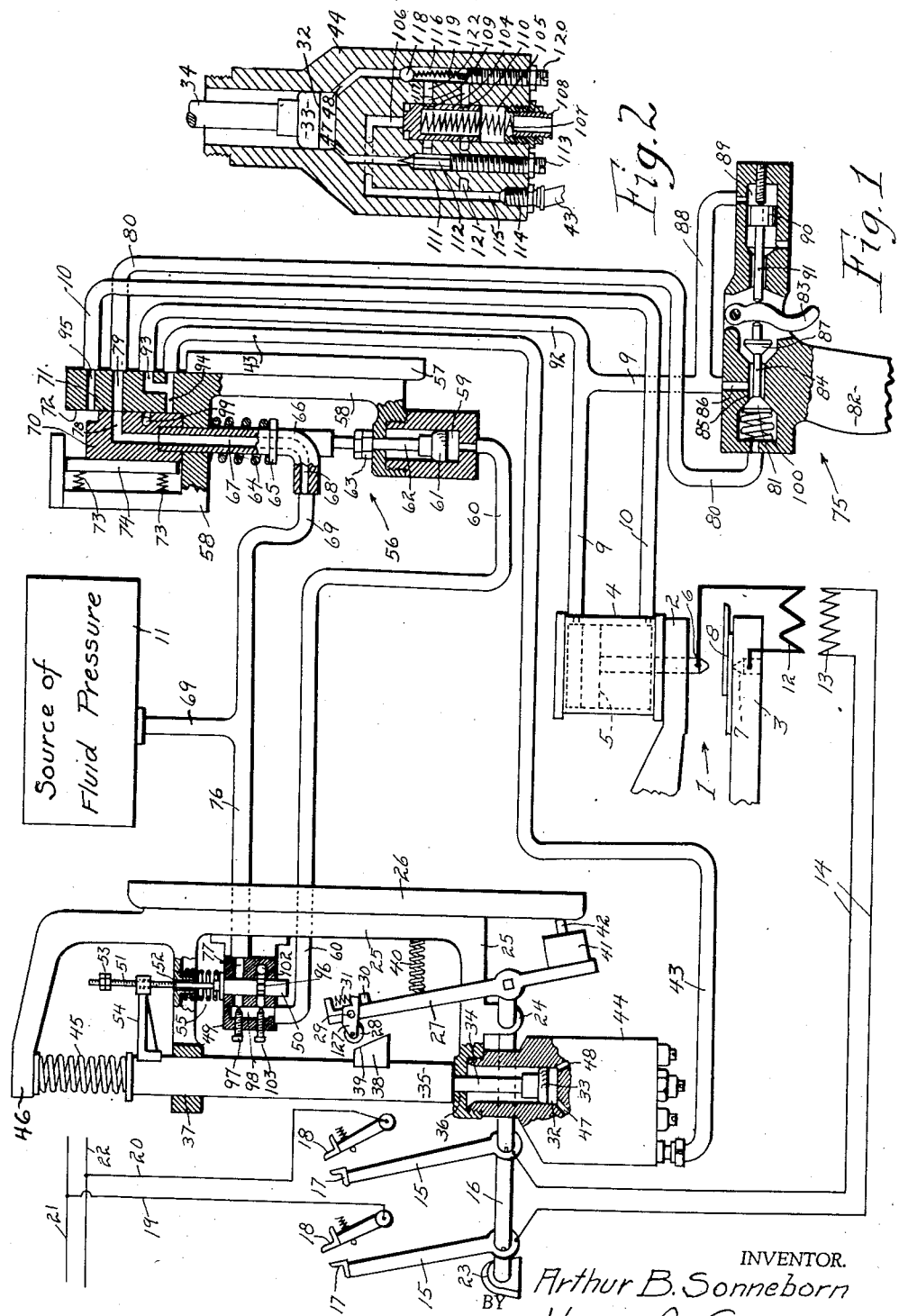
Figure 2:
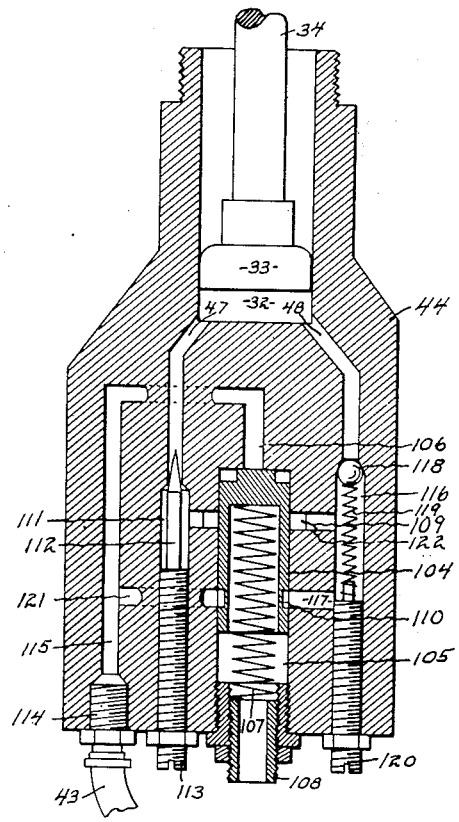

Fig. 2 is a longitudinal sectional view to enlarged scale of a part of the apparatus of Fig. 1.

Referring to the drawing I have shown generally at 1 a welding machine which may be of usual construction. The machine diagrammatically illustrated comprises an upper head 2 and a lower head 3, the upper head having associated therewith a fluid pressure cylinder 4 in which a piston 5 reciprocates. An upper electrode 6 is connected to the piston and reciprocates therewith toward and from a lower electrode 7 supported on the base 3 and when it reciprocates downwardly engages work 8 to be welded between the electrodes 6 and 7 under pressure.

The piston 5 is reciprocated downwardly by fluid pressure communicated to the upper side of the piston through a conduit 9 and is reciprocated upwardly by fluid pressure communicated to the lower side of the piston through a conduit 10, the fluid pressure, which may be compressed air, being supplied in a manner to be described from a fluid pressure or compressed air source 11.

Current is supplied to the electrodes 6 and 7 from the secondary 12 of a transformer, the primary 13 of which is energized by wires 14—14 connected to movable switch arms 15—15 mounted on a rocking shaft 16 which, when it rocks in one direction, causes contacts 17—17 on the arms 15—15 to engage stationary contacts 18—18 which are connected by wires 19 and 20 respectively to current supply mains 21 and 22.

When the shaft 16 is oscillated in one direction it engages the contacts 17 and 18 to initiate the flow of current, and when oscillated in the other direction disengages the contacts to break the current, after a predetermined time interval to thereby time the duration of a welding current impulse.

To thus oscillate the shaft the following means is provided. The shaft 16 is oscillatably supported in a bearing 23 at one end and at the other end in a bearing 24 on a bracket 25 mounted on a panel 26. An arm 27 is secured to the shaft and has on the upper end portion thereof a finger 127 carrying a roller 28, the finger being normally rocked around a pivot 29 against a stop 30 by a spring 31, the arrangement being such that the finger 127 may be rocked counter-clockwise.

Upon the bracket 25 is supported a fluid pressure cylinder 32 within which reciprocates a piston 33 mounted on a piston rod 34. At the upper end of the piston rod 34 is connected a plunger 35. The piston rod reciprocates in a bore 36 which guides the lower end of the plunger and the upper end of the plunger reciprocates in a bore 37 on the bracket 25.

A cam 38 is secured to the plunger, and when the plunger is in its normal downward position an inclined cam face 39 on the cam is disposed adjacent to and under the roller 28. When the plunger 35 is reciprocated upwardly upon the application of fluid pressure to the cylinder 32 on the under side of the piston 33, the cam face 39 engages the roller 28 and moves it out of the path of the cam face thereby giving an oscillatory movement to the arm 27 to oscillate the shaft 16 in the direction to engage the contacts 17—18; and after the cam has passed beyond the roller, a spring 40 abutting at one end upon the arm 27 and at the other end upon the brackets 25 oscillates the arm 27 in the other direction to disengage the contacts. Upon the downward stroke of the plunger 35 when pressure is removed from the cylinder 32, the cam 38 engages the roller 28 and rocks the finger 127 so that the roller is moved out of the path of the descending cam without moving the arm 27.

If movement of the plunger 35 is relatively slow, the roller 28 will remain in engagement with the cam face 39 and the length of the current impulse will be determined by the rate of movement of the plunger 35. If the movement of the plunger 35 however is very rapid, the roller 28 and the arm 27 will be kicked away from the cam face 39 when the roller is engaged thereby and the length of the current impulse may be determined by the strength of the spring 40 and the inertia of the arm 27 which may be supplemented by a weight 41 on the arm. The counter-clockwise position of the arm 27 may be positionally determined by a stud 42 on the arm engaging the bracket 25.

The plunger 35 is normally held in its downward position and is returned thereto by a spring 45 abutting at its lower end upon the upper end of the plunger, and at its upper end abutting on a bracket 46 forming part of the bracket 25 or secured thereto.

The arrangement above described for engaging the contacts 17—18 for a timed period to initiate, time, and interrupt the current, constitutes no essential part of the present invention excepting so far as it is co-ordinated with other parts and functions to be described such a switch constituting the subject matter of the co-pending application of Edward G. Beiderman, for improvements in Time controlled electric switches, filed June 13, 1936, Serial Number 84,981, and attention is directed thereto, for a more complete showing and description of the structure which is herein shown diagrammatically.

Fluid pressure, such as compressed air, from the source 11 is supplied to the cylinder 32 by a conduit 43 through a valve housing 44. Within the valve housing is a fluid pressure supply duct 47 and a fluid pressure exhaust duct 48 for the cylinder 32, as illustrated, and also within the valve housing 44 may be provided a valve which throttles the fluid pressure to the cylinder 32 as an additional means to control the velocity of movement of the plunger 35 to time the current at the contacts 17 and 18; and also valve means to direct fluid pressure to the cylinder 32 by the duct 47 or to exhaust it therefrom by the duct 48, and while these and other parts and their functions constitute no essential part of the present invention, one illustrative construction thereof is illustrated in Fig. 2 of the drawing and will now be described.

In this connection it may be added that subject matter illustrated and described herein but not claimed is claimed in said co-pending application, Serial Number 84,981 and in the co-pending application of Charles H. Rippel, Serial Number 120,362, filed January 13, 1937, for improvements in Pressure controls for pneumatically operated switches.

The valve housing 44 referred to, and which is secured to the bracket 25 as shown in Fig. 1, has therein, as shown in Fig. 2, a piston valve 104, reciprocable in a bore 105, the upper end of the valve as illustrated being normally held against the end of a duct 106 to close the same, by a spring 107, the upper end of which engages the valve and the lower end of which engages an adjusting screw 108. Preferably the valve 104 is of the trunk piston type and the upper portion of the spring is enclosed within the valve.

An annular chamber 109 surrounds the valve and communicates with the bore 105. The valve has an annular groove 110 therein axially spaced from the chamber 109.

The annular chamber 109 communicates with a bore 111, which communicates with the fluid pressure supply duct 47, the said communication being controlled by a needle valve 112 having a lower threaded portion 113, threaded into the housing, whereby the flow of fluid pressure to the duct 47 may be adjustably regulated. The conduit 43, threaded into the housing 44 at 114 communicates with a duct 115 in the housing which in turn communicates with the duct 106 referred to.

A duct 116 communicates at an upper portion with the exhaust duct 48 and at a lower portion communicates with the annular groove 110, of the valve, when in its normal position, by a duct 117. The lower end of the duct 48 is normally closed by a check ball valve 118. A spring 119 holds the valve 118 seated upon the end of the duct 48, and the tension of the spring may be adjusted by a screw 120. The upper end of the screw 120 furthermore is disposed opposite the end of the duct 117, and adjustment of the screw controls the effective size of the duct 117.

A duct 121 communicates between the duct 115 and the valve groove 110, in its normal position.

Pressure in the conduit 43 communicated through the ducts 115 and 106, when said pressure is at a valve predetermined as sufficient by the adjustment of the spring 107, acting upon the upper end of the valve 104, moves it downwardly against the spring tension until the upper end of the valve comes into alignment with the annular chamber 109. Thereupon pressure from the duct 106 flows into the chamber 109 and passing the valve 104 flows through the ducts 111 and 47 to the cylinder 32 to operate the piston 33 for the purposes described, the upward movement of the piston being at a rate determined by the adjustment of the needle throttle valve 112.

When pressure in the conduit 43 is removed, and the piston 33 is moved downwardly, as described, the release of pressure in the duct 106 permits the spring 107 to again raise and seat the valve 104 in its normal position. Downward movement of the piston 33 exhausts the pressure from the cylinder 32 through the exhaust duct 48 moving aside the valve 118, and the pressure flows into the duct 116 and thence through the duct 117 to the annular groove 110, through the duct 121 to the duct 115 and thence out by conduit 43.

This exhausts the cylinder 32 and the rate of the exhaust may be controlled by adjustment of the screw 120 to more or less open the duct 117.

When, as described above, pressure is admitted from duct 106 to the annular chamber 109 and thence to the cylinder 32, this pressure is also communicated by a duct 122 from the chamber 109 to the duct 116 and holds the ball valve 118 firmly against its seat, holding the duct 48 closed and preventing leakage of pressure out of the chamber 32.

Mounted upon the bracket 25 is a valve housing 49 in which reciprocates a piston valve 50 having a stem 51 secured thereto which extends upwardly through and is guided in a bore 52 in the bracket 25 and has on its upper end portion a stop 53 which may be conveniently provided and rendered adjustable longitudinally of the stem by being in the form of a pair of lock nuts.

An arm 54 is secured to the plunger 35, extends laterally therefrom and surrounds the stem 51, and when the plunger is in its downward position is spaced from the stop 53 but when the plunger 35 moves upwardly the arm 54 engages the stop 53 and lifts the valve 50 to an upper position. The valve 50 is normally held down by a spring 55 abutting upon the valve and upon the bracket 25.

The purposes of the valve 50 and other parts within the housing 49 will presently be described.

Indicated generally at 56 is a fluid pressure operated valve device, the parts for which are mounted on a panel 57. It comprises a bracket 58 provided with a fluid pressure cylinder 59 supplied with fluid pressure by a conduct 60 from the source 11 in a manner to be described, and having a piston 61 reciprocable therein, the piston rod 62 of which has a stop 63 thereon normally supporting the piston in a downward position. The piston is held downwardly by a spring 64 abutting upon the bracket 58 and upon a collar 65 on the upper end portion of the piston rod, which is enlarged into the form of a valve plunger 66.

The plunger 66 has a duct 67 longitudinally therethrough which in the lower part thereof extends laterally as at 68 and is connected to a flexible conduit 69 connected directly to the source 11 of fluid pressure. The plunger 66 is connected to a vertically reciprocable valve 70, having a planar surface 71 which is held with pressure against a planar surface 72 on the bracket 58 by a pair of springs 73—73 which abut upon the bracket 58 and upon a plate 74. By this arrangement the valve 70 may slide on the plate 74 and on the surface 72 maintaining sealed contact with the surface 72 for purposes to be described.

Illustrated generally at 75 is an operator's gun by which operations of the apparatus are controlled to effect welds at the machine 1.

Parts of the gun 75 as well as parts of the pressure operated valve device 56, and parts within the valve housing 49, not described above, will now be described in connection with a mode of operation of the apparatus which follows.

With the parts in the normal position shown, fluid under pressure from the source 11 conducted by a conduit 76 to a duct 77 in the valve housing 49 is cut off at the inner end of the duct by the valve 50. The fluid pressure is also communicated from the source 11 to the conduit 69 and thence by the duct 67 in the piston plunger 66 and may flow upwardly therethrough into the valve 70, through a duct 78 therein, and through a duct 79 with which it is normally aligned, to a conduit 80 connected to the gun 75. Flow through the conduit 80 is cut off at the gun by a valve 81. Thus no fluid can flow from the source. To perform a weld on the work 8 at the machine 1, the gun operator, who holds the gun by a grip 82, pulls a trigger 83 which reciprocates rearwardly a plunger 84 connected to the valve 81 which opens the valve 81 allowing the fluid under pressure to flow from the conduit 80 around the valve 81 into a duct 85 and out at a duct 86, to the conduit 9, the movement of the plunger 84 closing the inner end of the duct 85 by a valve 87.

Fluid pressure in the duct 9 is communicated to a conduit 88 by which the fluid flows into a cylinder 89 in the gun and acting upon a piston 90 in the cylinder moves a piston rod 91 inwardly, the inner end of which engages the trigger 83 and holds it in the operated position so that it will remain operated even if the operator removes his finger from it.

Fluid pressure in the conduit 9, also communicated to the cylinder 4, moves the piston 5 downwardly to engage the electrodes 6 and 7 with the work.

The fluid pressure in the conduit 9 is communicated to a conduit 92 connected therewith or with the cylinder 4, above the piston and thence by ducts 93 and 94 is communicated to the conduit 43 and thence to the switch cylinder 32, but during the movement of the piston 5, this pressure is less than source pressure and insufficient to overcome the spring 45, which holds the piston 33 downwardly to the cylinder 32, so that no further action takes place.

When, however, the piston 5 has reached the bottom of its stroke and engages the work with pressure, the pressure in the cylinder above the piston, and therefore in the conduits, 9, 92 and 43, rises and reaches the valve at which it is able to move the valve 103 and admit pressure to the cylinder 32 to raise the plunger 35.

It will be noted that during the downward movement of the piston 5, air below the piston exhausts outwardly through the conduit 10 to a duct 95 to atmosphere, the inner end of this duct at this time being uncovered by the valve 70 in its lower normal position.

The plunger 35 now moves upwardly and causes the said current impulse to flow to effect the weld as above described and at, or adjacent to, the top of its stroke the arm 54 on the plunger 35 lifts the valve 50 as described and now air under pressure in the duct 77 as described, flows around a neck 96 on the valve and thence past a throttling valve screw 97 into a duct 98 and thence into the conduit 60, and the pressure is thereby communicated to the cylinder 59 of the valve device 56 and moves the plunger 66 thereof upwardly raising the valve 70.

It will have been noticed that at this time the current impulse has already been cut off by the upward movement of the plunger 35, and a time interval begins to run determined by the rate of movement of the plunger 66 which in turn is determined by the throttling screw 97.

The delayed upward movement of the plunger 66 by the valve 97 predetermines a time interval during which the electrodes remain engaged with the work after the current is cut off, such a holding period being sometimes referred to as "cold hold" control.

After a determined upward movement of the valve 70 the duct 78 is aligned with the duct 85, the duct 79 is aligned with an exhaust duct 99, and the duct 94 is uncovered by the lower end of the valve. As a result of these changes, which occur after a time interval, the cylinder 4 of the welding machine 2 exhausts through the conduit 9 and the conduit 92 and ducts 93 and 94; and fluid pressure is supplied to the cylinder 4 below the piston 5 from the source 11, by conduit 69, ducts 67, 78, 95 and conduit 10; which separates the electrodes and restores the welding machine 1 for another operation; and the pressure in the cylinder 32 which has been holding the plunger 35 upwardly exhausts by way of the conduit 43 and duct 94 and under the valve 70, so that the plunger 35 returns downwardly; and the conduit 80 supplying pressure to the gun 75 exhausts through the duct 79 and the exhaust duct 99. A spring 100 now returns the gun valve and piston 90 and trigger 83 to their normal position for another operation.

When the plunger 35 returned downwardly as described, the spring 55 restored the valve 50 downwardly establishing an exhaust for the valve cylinder 59 by way of the conduit 60, duct 98 and around the valve neck 96 and out at an exhaust 102, the air flowing past a throttle valve 103 whereby the rate of return of the valve 70 is delayed for a time interval. Inasmuch as another operation of the apparatus cannot be performed until the valve 70 has returned to its lower position, this time delay predetermines the frequency at which successive operations may be performed. It will be noted that after the valve 81 has once been operated by the trigger 83, it is held operated independently of the trigger at least until after the contactor contacts 17—18 have closed and again opened so that the contactor operating cycle when once started cannot be interrupted by a succeeding premature operation of the trigger.

To resume in brief, when the gun 75 is operated, it is automatically held operated and fluid pressure is supplied to the welding machine 1 which engages the electrodes with the work; and when the pressure in the cylinder 4 thereof has risen to a sufficiently high value, sufficient to move the valve 104, the switch contacts 17 and 18 are engaged and then disengaged sending a timed current impulse through the electrodes and the work, and the valve 50 is raised. This sets into action the valve device 56 which operates the valve 70 after a suitable time interval during which the electrodes remain engaged with the work, although the current is cut off. When the valve device 56 has operated, it restores the gun 75, and disengages the electrodes from the work restoring the machine 1, and restores the plunger 35 downwardly, resetting the valve 50, and then restores itself, it being completely restored after another time interval. The time interval during the operation of the device 56 determines the time of the cold hold and the time interval during the restoring of the device 56 determines the possible frequency of successive operations.

Both time periods may be adjusted respectively by the valve screws 97 and 103 as described, and independently of each other; and by no adjustment can the valve device 56 be made to operate ahead of the contactor.

The duration of the welding current may be adjustably changed by the screw 110 which throttles the supply of pressure to the cylinder 32, and the rate of return of the plunger 35 may be controlled by the screw 120 which throttles the exhaust from the cylinder 32.

My invention is not limited to the exact details of construction illustrated and described, since it is obvious that changes and modifications may be made within the spirit of my invention without sacrificing its advantages and my invention is comprehensive of all such modifications and changes which come within the scope of the appended claims.

I claim:

1. In an electric welding system an electric welding machine having electrodes and an electrode energizing electric circuit and comprising electrode operating means to pressure-engage the electrodes with work to be welded, an electric contactor, movable contactor operating means to close the circuit and maintain it closed for a predetermined time interval and then open it to effect an electric weld at the electrodes, timing means controlling the electrode operating means to maintain pressure engagement of the electrodes with the work for a predetermined time interval after opening of the circuit, actuating means for the timing means, and control means operated by movement of the contactor operating means to control actuation of the timing means.

2. In an electric welding system an electric welding machine having electrodes and an electrode energizing electric circuit and comprising electrode operating means to pressure-engage the electrodes with work to be welded, an electric contactor, contactor operating means to close the circuit and maintain it closed for a predetermined time interval and then open it to effect an electric weld at the electrodes, timing means controlling the electrode operating means to maintain pressure engagement of the electrodes with the work for a predetermined time interval after opening of the circuit, said timing means also controlling the contactor operating means to prevent a successive closure of the circuit thereby until after a second predetermined time interval, actuating means for the timing means, and control means operated by the contactor operating means to control actuation of the timing means.

3. In an electric welding system, a source of fluid pressure, a welding machine having electrodes and an electrode energizing electric circuit and comprising fluid pressure means actuated by fluid pressure from the source to pressure-engage the electrodes with work to be welded, an electric contactor, fluid pressure actuated means to operate the contactor to close the electric circuit and maintain it closed for a predetermined time interval and then open it, a fluid pressure operated timing means, a valve operated by the contactor operating means to effect actuation of the timing means by pressure from the source, and said timing means controlling the supply of fluid pressure from the source to the welding machine to maintain the electrodes pressure engaged with the work for a predetermined time interval after opening of the circuit.

4. In an electric welding system, a source of fluid pressure, a welding machine having electrodes and an electrode energizing electric circuit and comprising fluid pressure means actuated by fluid pressure from the source to pressure-engage the electrodes with work to be welded, an electric contactor, fluid pressure actuated means to operate the contactor to close the electric circuit and maintain it closed for a predetermined time interval and then open it, a fluid pressure operated timing means, a valve operated by the contactor operating means to effect actuation of the timing means by pressure from the source, said timing means controlling the supply of fluid pressure from the source to the welding machine to maintain the electrodes pressure engaged with the work for a predetermined time interval after opening of the circuit and said timing means controlling supply of fluid pressure to the contactor operating means to prevent supply of fluid pressure thereto from the source until after a second predetermined time interval.

5. In an electric welding system, a source of fluid pressure, a welding machine comprising electrodes and an electrode energizing electric circuit and fluid pressure operated means to effect pressure engagement of the electrodes with the work to be welded, a normally restored contactor, fluid pressure operated means to effect operation of the contactor to close the circuit and maintain it closed for a time interval and then open it, a valve device, fluid pressure operated means to operate the valve device, conduit means and a valve operated by the contactor operating means to supply fluid pressure from the source to the valve device operating means to operate it when the contactor is operated and exhaust it when restored, adjusting means to control the rate of fluid supply to the valve device operating means to retard operation thereof and adjusting means to control rate of exhaust from the valve device operating means to retard restoring thereof, the valve device controlling supply of fluid pressure to the welding machine to maintain the electrodes pressure engaged with the work for a time interval after opening of the circuit and also controlling supply of fluid pressure to the contactor operating means to prevent a successive operation thereof until after a second predetermined time interval.

6. In an electric welding system on electric welding machine having electrodes and en electrode energizing electric circuit and comprising electrode operating means to pressure-engage the electrodes with work to be welded, an electric contactor, contactor operating means to close the circuit and maintain it closed for a predetermined time interval and then open it to effect an electric weld at the electrodes, timing means controlling the contactor operating means to prevent a successive closure of the circuit thereby until after a second predetermined time interval, actuating means for the timing means, and control means operated by the contactor operating means to control actuation of the timing means.

7. In an electric welding system, a source of fluid pressure, a welding machine having electrodes and an electrode energizing electric circuit and comprising fluid pressure means actuated by fluid pressure from the source to pressure-engage the electrodes with work to be welded, an electric contactor, fluid pressure operating means to operate the contactor to close the electric circuit and maintain it closed for a predetermined time interval and then open it, fluid pressure operated timing means, a valve operated by the contactor operating means to effect actuation of the timing means by pressure from the source, and said timing means controlling the supply of fluid pressure from the source to the welding machine to maintain the electrodes pressure engaged with the work for a predetermined time interval after opening of the circuit.

8. In an electric welding system, a source of fluid pressure, a welding machine having electrodes and an electrode energizing electric circuit and comprising fluid pressure means actuated by fluid pressure from the source to pressure-engage the electrodes with work to be welded, an electric contactor, contactor operating means to operate the contactor to close the electric circuit and maintain it closed for a predetermined time interval and then open it, fluid pressure operated timing means, a valve operated by the contactor operating means to effect actuation of the timing means by pressure from the source, said timing means controlling the supply of fluid pressure from the source to the welding machine to maintain the electrodes pressure engaged with the work for a predetermined time interval after opening of the circuit and said timing means controlling the contactor operating means to prevent a successive closure of the circuit thereby until after a second predetermined time interval.

9. In an electric welding system, a source of fluid pressure, a welding machine having electrodes and an electrode energizing electric circuit and comprising fluid pressure means actuated by fluid pressure from the source to pressure-engage the electrodes with the work to be welded, an electric contactor, fluid pressure actuated means to operate the contactor to close the electric circuit and to maintain it closed for a predetermined time interval and then open it, fluid pressure operated timing means, a valve operated by the contactor operating means to effect actuation of the timing means by pressure from the source, said timing means controlling supply of fluid pressure to the contactor operating means to prevent supply of pressure thereto from the source until after a predetermined time interval.

10. In an electric welding system, a source of fluid pressure, a welding machine having electrodes and an electrode energizing electric circuit and comprising fluid pressure means actuated by fluid pressure from the source to pressure-engage the electrodes with the work to be welded, an electric contactor, contactor operating means to operate the contactor to close the electric circuit and maintain it closed for a predetermined time interval and then open it, fluid pressure operated timing means, a valve operated by the contactor operating means to effect actuation of the timing means by pressure from the source, said timing means controlling the contactor operating means to prevent a successive closure of the circuit until after a predetermined time interval.

11. In an electric welding system, an electric welding machine having electrodes, and an electrode energizing electric circuit and comprising electrode operating means to pressure-engage the electrodes with work to be welded, an electric contactor operating means to close the circuit and to maintain it closed for a predetermined time interval and then open it to effect an electric weld at the electrodes, manually operable means for effecting actuation of the electrode operating means and contactor operating means, timing means actuated by the contactor operating means and holding means to maintain the manually operable means operated for a time period of the timing means.

12. In an electric welding system, a source of fluid pressure, a welding machine having electrodes and an electrode energizing electric circuit and comprising fluid pressure means actuated by fluid pressure from the source to pressure-engage the electrodes with the work to be welded, an electric contactor, fluid pressure actuated means to operate the contactor to close the electric circuit and maintain it closed for a predetermined time interval and then open it, a fluid pressure timing means, actuated by operation of the contactor manually operable means for effecting communication of fluid pressure to the electrode fluid pressure actuated means and to the contactor fluid pressure actuating means, and fluid pressure operable holding means for maintaining the manually operable means operated for a time period of the fluid pressure timing means.

ARTHUR B. SONNEBORN.